Feb. 19, 1957 E. H. THOM 2,782,302

FREQUENCY DISCRIMINATORS OR THE LIKE

Filed March 15, 1954

INVENTOR
EUGENE H. THOM
BY Bruce L. Birchard
HIS ATTORNEY

United States Patent Office 2,782,302

Patented Feb. 19, 1957

2,782,302

FREQUENCY DISCRIMINATORS OR THE LIKE

Eugene H. Thom, Montebello, Calif., assignor to Hoffman Electronics Corporation, a corporation of California Application March 15, 1954, Serial No. 416,189

3 Claims. (Cl. 250—27)

This invention is related to frequency discriminators employed in electronic apparatus and more particularly to an improved frequency discriminator which will lend itself to low-cost manufacture.

In the past, many types of circuits have been employed as frequency discriminators in automatic frequency control systems and frequency modulation receivers. Conventional frequency discriminator circuits employ tuned circuits and interstage transformers, which contribute to increased cost of manufacture.

Therefore, it is an object of this invention to provide an improved frequency discriminator.

It is a further object of this invention to provide an improved frequency discriminator which will lend itself to low-cost manufacture.

According to this invention, signal deviation from the null frequency is accompanied by a positive or negative change in the reactance exhibited by two discriminator reactance legs, and produces an output voltage having substantially the same wave-form as the input signal, with the exception that the reference axis of the output wave-form will be above or below the reference axis of a corresponding A. C. wave-form. A filter circuit removes the ripple in the output signal to provide a D. C. output voltage dependent in polarity and amplitude upon the magnitude and direction of deviation of the input frequency from the norm. Coupling to a preceding circuit may be by a simple R. C. or L. C. method, thus eliminating the transformers and tuned circuits required with conventional discriminators.

The features of the present invention which are believed to be novel are set forth with particularity in the appended claims. The present invention, both as to its organization and manner of operation, together with further objects and advantages thereof, may best be understood by reference to the following descriptions taken in connection with the accompanying drawing in which:

Figures 1, 2:
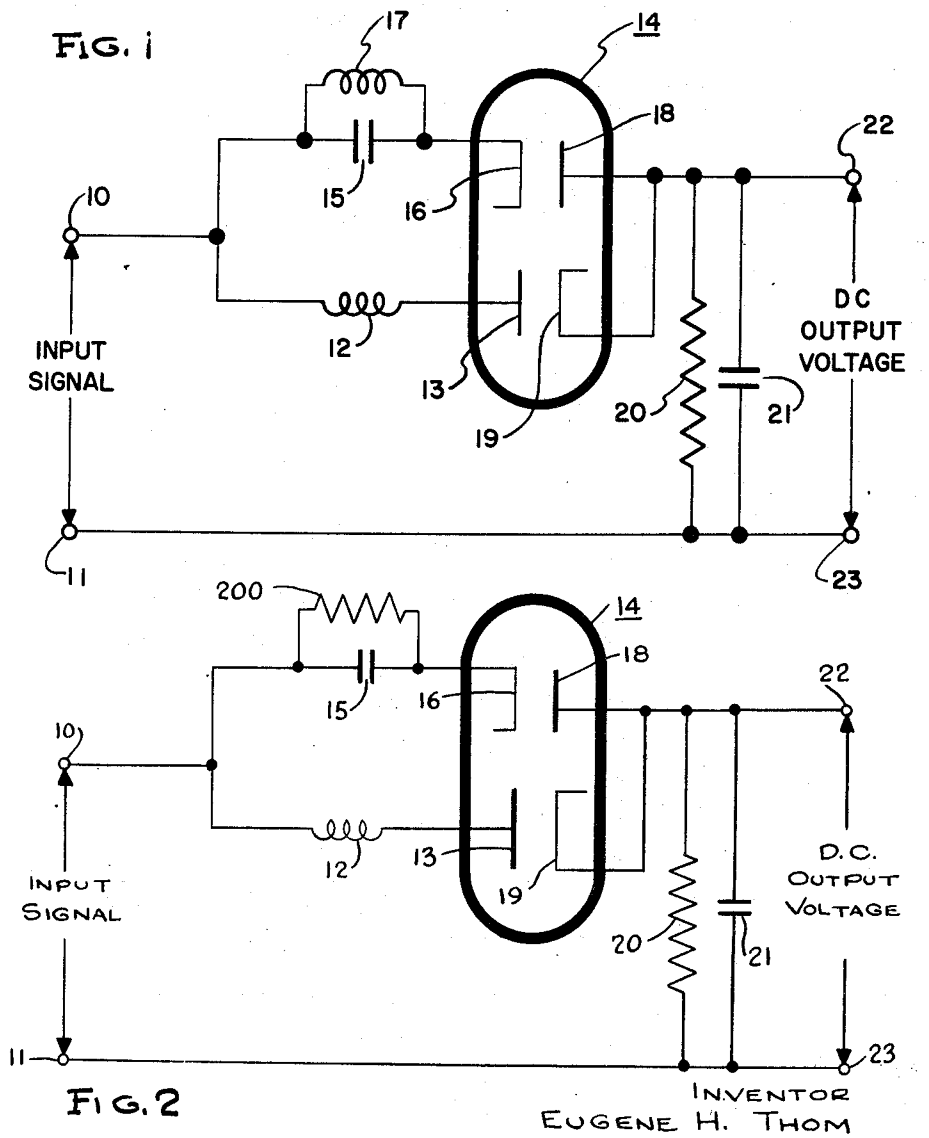
Figure 1 is a schematic diagram of a frequency discriminator according to this invention.
Figure 2 is an alternate form of the invention.

In Figure 1, terminals 10 and 11 are input terminals for coupling to a signal source (not shown). Input terminal 10 is connected through inductor 12 to anode 13 of duo-diode 14 and through capacitor 15 to cathode 16 of duo-diode 14. Capacitor 15 is shunted by inductor 17, which serves as a D. C. return line. In actual practice, the inductance of inductor 17 is many times that of inductor 12. A resistor exhibiting a moderately high value of resistance may be employed in lieu of inductor 17, if desired. See Figure 2 and resistor 200 therein. Anode 18 and cathode 19 of duo-diode 14 are connected together and to one junction of leads from output load resistor 20 and filter capacitor 21. Input terminal 11 is connected to the remaining common junction of leads from resistor 20 and capacitor 21. The D. C. output voltage is taken from output terminals 22 and 23, which are connected to opposite terminals of capacitor 21.

The discriminator circuit described in Figure 1 operates as follows. The input signal is applied between input terminals 10 and 11, and supplies a D. C. ground return for the two reactance legs. The reactances of capacitor 15 and inductor 12 are chosen to be of equal magnitude at the input signal null-frequency. Since the inductance of D. C. (direct current) return inductor 17 is so chosen that the reactance offered by this inductance at all operating frequencies is many times greater than the reactance offered by capacitor 15, current (electron flow) will flow between cathode 16 and anode 18 of duo-diode 14 on negative half-cycles of the input signal, producing a negative voltage pulse across resistor 20 between output terminals 22 and 23. During positive half-cycles of the input signal, current (electron flow) will be conducted between cathode 19 and anode 13 to produce a positive voltage pulse across resistor 20 and, consequently, across output terminals 22 and 23. When the input signal is at the null-frequency, the positive and negative output half-cycles from the diodes 14 will be equal in amplitude. Capacitor 21, chosen to have a large capacitive value, filters the output wave-form across resistor 20. Since the positive and negative half-cycles of the output wave-form will be equal, then, at the null-frequency, no D. C. output voltage will be present between output terminals 22 and 23. Should the signal frequency increase, the reactance offered by inductor 12 will increase and the reactance offered by capacitor 15 will decrease a corresponding amount. Hence, negative half-cycles of the input signal will produce an increased amount of current flow and a greater voltage drop across resistor 20, while at the same time positive half-cycles of the input signal will produce a decreased amount of current flow, and, consequently, a lesser voltage drop across resistor 20; hence, the output wave-form across resistor 20, neglecting the effect of capacitor 21, will exhibit large negative pulsations and small positive pulsations. The effect of the addition of capacitor 21 is to average (and filter) the pulsating D. C. voltage existing between output terminals 22 and 23 and for the condition just recited, a negative D. C. voltage will result. Correspondingly, should the input signal frequency drop below the predetermined null-frequency, negative output half-cycles appearing across resistor 20 will decrease in magnitude and positive output half-cycles will increase in magnitude, thereby effecting, after filtering by capacitor 21, a positive D. C. output voltage approximately proportional to the decrease in frequency of the input signal from the null point.

From the foregoing description of operation, it is apparent that the inductance and capacitance legs in the subject figure may be interchanged so as to reverse diode connections without affecting circuit operation other than to reverse the polarity of the output voltage. In addition, either reactance leg may be replaced by a resistor, in which case the amplitude of the output D. C. voltage will be decreased.

The present invention is very well suited as a second detector for frequency modulation receivers because of its wide linear frequency response. In such an application, capacitor 21 acts as a radio frequency by-pass filter. The response curve of conventional discriminators tends to round off in the upper and lower response regions, thereby introducing distortion unless the receiver is sharply tuned and the channel falls within the linear portion of the response curve. Because of the wide linear response exhibited by the present invention, this sharp-tuning requirements may be avoided.

By employing the present invention in an automatic frequency control system for use with a multi-frequency oscillator, the discriminator may be conveniently adjusted to the various null-frequencies by means of switching in more or less capacitance or inductance in one of the discriminator reactance legs. Conventional discriminators would require the tuning of two or more circuits to accomplish the same result.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A discriminator circuit including a first unidirectionally conductive device having a first element and a second element, a second unidirectionally conductive device having first and second elements, a plurality of input terminals, a first circuit branch including an element exhibiting inductive reactance, said first circuit branch being connected between one of said input terminals and said first element of said first unidirectionally conductive element, a second circuit branch including an element exhibiting capacitive reactance, and a high impedance element continuous with respect to direct current shunting said capacitive element, said second branch being connected between said one input terminal and said second element of said second unidirectionally conductive device, a plurality of output terminals, said second element of said first unidirectionally conductive device and said first element of said second unidirectionally conductive being connected to each other and to a first of said output terminals, a second of said output terminals being connected to a second of said input terminals, and a parallel-connected resistance-capacitance combination shunting said first and second output terminals.

2. A discriminator circuit including, in combination, a plurality of input terminals, a first reactance circuit including an inductor connected in series with a first diode, a second reactance circuit including a capacitor shunted by a direct current return inductor and connected in series with a second diode, one terminal of each of said first and second reactance circuits being coupled to a first input terminal such that the effective anode-side of one of said diodes and the effective cathode-side of the remaining diode are coupled together through said first and second reactance circuits, the remaining terminals of said first and second reactance circuits being joined together, and an output impedance and filter circuit being connected between the junction of said first and second reactance circuits and a second input terminal.

3. A discriminator circuit including, in combination, a plurality of input terminals, a first reactance circuit including an inductor connected in series with a first diode, a second reactant circuit including a capacitor shunted by direct current return resistor and connected in series with a second diode, one terminal of each of said first and second reactance circuits being coupled to a first input terminal such that the effective anode-side of one of said diodes and the effective cathode-side of the remaining diode are coupled together through said first and second reactance circuits, the remaining terminals of said first and second reactance circuits being joined together, and an output impedance and filter circuit being connected between the junction of said first and second reactance circuits and a second input terminal.

References Cited in the file of this patent

UNITED STATES PATENTS

| | | |
|---|---|---|
| 2,302,834 | Bliss | Nov. 24, 1942 |
| 2,498,253 | Curtis | Feb. 21, 1950 |
| 2,634,367 | Joseph | Apr. 7, 1953 |